Patented Dec. 26, 1933

1,940,760

UNITED STATES PATENT OFFICE

1,940,760

ORGANIC ARSENIC COMPOUND

Edward Lyons and Oswald M. Gruhzit, Detroit, Mich., assignors to Parke, Davis & Company, Detroit, Mich., a corporation of Michigan No Drawing. Application September 6, 1927, Serial No. 217,880. Renewed May 13, 1933

12 Claims. (Cl. 260—14)

The invention relates to the production of organic arsenic compounds having a therapeutic or germicidal value and is more particularly concerned with compounds useful in the treatment of syphilis and other diseases due to spirochetes or trypanosomes.

One of the objects of our invention is to produce new water-soluble, stable arsenic compounds having a high therapeutic ratio. Another object of the invention is to provide a process for converting certain pentavalent arsenicals into a form in which the toxicity to the spirochete is increased.

We have discovered that by causing pentavalent organic arsenic acids to react with certain thio-acids containing the sulphydrate group we are enabled to obtain new compounds having increased toxicity toward spirochetes. This is a somewhat surprising result since similar reactions carried out with trivalent arsenic compounds have resulted in derivatives, the toxicity of which toward spirochetes is less than the compounds from which they are derived (see United States Public Health Reports, vol. 38, page 1911, August 17, 1923).

In carrying out our invention we cause a reaction between a pentavalent arsonic acid and a thio-acid such as thioglycolic acid, cystein, thiosalicylic acid, etc.

The following five examples of our invention are given:

*Example 1.*—Compound derived from the interaction of the alkali metal salt of thioglycolic acid and 3-amino-4 hydroxy phenyl arsonic acid

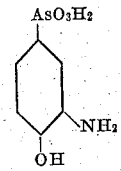

To 3.68 gm. thioglycolic acid previously neutralized to the sodium salt or equivalent base in about 20 cc. water are added 2.33 gm. of 3-amino-4 hydroxy phenyl arsonic acid. The acid dissolves. The reaction is hastened by warming. The resulting reaction mixture is made just alkaline and precipitated by pouring into methyl alcohol. Ether is now added to precipitate it more completely. The substance so obtained has a tendency to darken. It is easily soluble in water, forming a slightly alkaline solution. The compound contains 12.0% of arsenic.

*Example 2.*—Compound obtained by the interaction of the sodium salt of thioglycolic acid with phenylglycineamid-4 arsonic acid

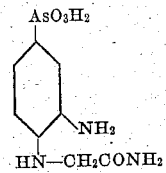

To 3.68 gm. thioglycolic acid previously converted to its sodium (or equivalent) salt, 2.74 gm. of phenylglycineamide-4 arsonic acid are added and solution takes place. To hasten and complete the reaction the solution is warmed. The reaction mixture is then evaporated to dryness or poured into methyl alcohol. Ether is then added to completely precipitate the product which is a white substance readily soluble in water and having an arsenic content of 11.0%.

*Example 3.*—Compound obtained by the interaction of sodium thioglycolate with 3-nitro-4 hydroxy phenyl arsonic acid

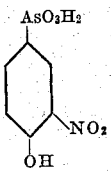

1.84 gm. of thioglycolic acid (converted to the sodium salt) and 2.63 gm. of 3-nitro-4 hydroxy phenyl-arsonic acid are mixed in solution. The reaction product is a brick red, water soluble compound having an arsenic content of about 15.0%.

*Example 4.*—Compound obtained by the interaction of cystein with arsanilic acid

Using a method similar to that outlined in the previous examples, 2.17 gm. of arsanilic acid are mixed with 1.2 gm. cystein and after solution has taken place the mixture is made just alkaline and precipitated by pouring into methyl alcohol. The substance precipitated is the sodium salt of the new compound and is originally white although it turns brown upon drying. The amount of arsenic found in the compound by test was 19.9%.

*Example 5.*—Compound derived from the interaction of cystein with tryparsamid

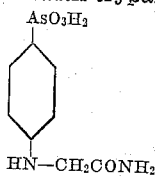

This compound may be prepared in a manner similar to that given in Example 2. The thio-derivative obtained by this reaction is a brownish material, soluble in water and containing 18.7% arsenic.

In all of the examples given above, it will be noted that the arsenic in the original material is pentavalent and as heretofore stated the striking fact about the resulting compounds is that while the original pentavalent arsenic compounds are usually feeble in their action on spirochetes and trypanosomes, the conversion into thio-derivatives yields compounds possessing an unusually high therapeutic ratio.

While we have listed five specific examples of our invention, it is obvious that our method may be applied to a wide variety of analogous compounds, the essential being that the original pentavalent arsenic compounds are converted into final products having much higher therapeutic ratios in their action on spirochetes and trypanosomes.

What we claim as our invention is:—

1. The process of obtaining a therapeutic agent having a strong reaction on spirochetes and trypanosomes which comprises the treatment of 3 nitro 4 hydroxy phenyl arsonic acid with the sodium salt of thioglycolic acid and obtaining a compound having the thioglycollic acid radical bonded directly to the arsenic atom.

2. A therapeutic agent obtained by the interaction of 3 nitro 4 hydroxy phenyl arsonic acid with the sodium salt of thioglycolic acid, said therapeutic agent being a chemical compound containing the thioglycolic acid radical bonded directly to the arsenic atom, said compound being water soluble and being characterized by the physiological properties of strong reaction on spirochetes and trypanosomes and high therapeutic ratio.

3. The process which comprises the reacting of a pentavalent arsonic acid containing a substituted phenyl group in which the substituent is one of the class consisting of the groups OM and

where M is H or a salt-forming group and $R^1$ and $R^2$ are monovalent alkyl groups or H, with an organic thio-acid containing the sulphydrate group and a carboxylic group thereby obtaining from the reaction a compound having the thio-acid radical directly bonded to the arsenic atom.

4. The process which comprises the reacting of a pentavalent arsonic acid containing the following group

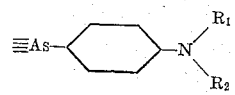

where $R_1$ and $R_2$ are monovalent alkyl groups or H, with a thio-acid of the formula $HS\ R_3\ CO_2\ M$ where $R_3$ is one of the class consisting of $CH_2$, $C_6H_4$ and $CH_2CHNH_2$ and M is one of the class consisting of H and alkali metals.

5. The process which comprises the reacting of phenyl-glycineamid-4-arsonic acid with an organic thio-acid containing the sulphydrate group and a carboxylic group, thereby obtaining from the reaction a compound having the thio-acid radical directly bonded to the arsenic atom.

6. The process which comprises the reacting of phenyl-glycineamid-4-arsonic acid with thioglycolic acid thereby obtaining a compound having the thioglycolic acid radical bonded directly to the arsenic atom.

7. A therapeutic agent obtained by the interaction of an arsonic acid containing an aromatic grouping in which is substituted an amino-group with a thio-acid containing the group $HS\ R\ CO_2M$ where R is on of the class consisting of $CH_2$, $C_6H_4$ and $CH_2CHNH_2$ and M is one of the class consisting of hydrogen and the alkali metals, said therapeutic agent being a chemical compound containing the thio-acid radical bonded directly to the arsenic atom, said compound being water soluble and being characterized by the physiological properties of strong reaction on spirochetes and trypanosomes and high therapeutic ratio.

8. A therapeutic agent obtained by the interaction of an arsonic acid containing the following group

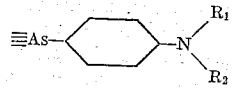

where $R_1$ and $R_2$ are monovalent alkyl groups or H, with a thio-acid containing the group $HS\ R\ CO_2M$ where R is one of the class consisting of $CH_2$, $C_6H_4$ and $CH_2CHNH_2$ and M is one of the class consisting of hydrogen and the alkali metals, said therapeutic agent being a chemical compound containing the thio-acid radical bonded directly to the arsenic atom, said compound being water soluble and being characterized by the physiological properties of strong reaction on spirochetes and trypanosomes and high therapeutic ratio.

9. A therapeutic agent obtained by the interaction of phenyl-glycineamid-4-arsonic acid with the alkali metal salt of thioglycolic acid, said therapeutic agent comprising a chemical compound containing the thioglycolic acid radical bonded directly to the arsenic atom.

10. A therapeutic agent obtained by the interaction of phenylglycineamid-4-arsonic acid with the alkali metal salt of cystein, said therapeutic agent comprising a chemical compound containing the cystein acid radical bonded directly to the arsenic atom.

11. In the process of obtaining a water-soluble organic arsenic compound, the step comprising reacting a pentavalent aryl arsonic acid with a soluble salt of an organic thio-acid containing the sulphydrate group and a carboxylic group, thereby obtaining from the reaction a soluble compound having the thio-acid radical directly bonded to the arsenic atom.

12. In the process of obtaining a water-soluble organic arsenic compound, the step comprising reacting a pentavalent arsonic acid containing a substituted phenyl group in which no unsubstituted amino group is directly joined to the carbon atoms of the phenyl ring with an organic thiol compound HS-R-COOM where M is hydrogen or a salt-forming group, thereby obtaining from the reaction a soluble compound having the thio-acid radical directly bonded to the arsenic atom.

EDWARD LYONS.
OSWALD M. GRUHZIT.

Certificate of Correction

Patent No. 1,940,760. December 26, 1933.

EDWARD LYONS ET AL.

It is hereby certified that error appears in the printed specification of the above numbered patent requiring correction as follows: Page 1, lines 56 to 63 inclusive, strike out the formula and insert instead

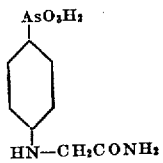

and that the said Letters Patent should be read with this correction therein that the same may conform to the record of the case in the Patent Office.

Signed and sealed this 15th day of May, A. D. 1934.

[SEAL]

BRYAN M. BATTEY,
Acting Commissioner of Patents.